(12) United States Patent
Itamura et al.

(10) Patent No.: US 7,808,770 B2
(45) Date of Patent: Oct. 5, 2010

(54) MONOLITHIC CERAMIC CAPACITOR

(75) Inventors: Hiroto Itamura, Echizen (JP); Masaaki Taniguchi, Nyuu-gun (JP); Yoshio Kawaguchi, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 338 days.

(21) Appl. No.: 12/140,341

(22) Filed: Jun. 17, 2008

(65) Prior Publication Data
US 2009/0002920 A1    Jan. 1, 2009

(30) Foreign Application Priority Data

Jun. 27, 2007    (JP) ............................. 2007-169175
Mar. 28, 2008    (JP) ............................. 2008-085617

(51) Int. Cl.
*H01G 4/228*    (2006.01)
*H01G 4/005*    (2006.01)

(52) U.S. Cl. ...................... 361/309; 361/306.3; 361/303
(58) Field of Classification Search ... 361/306.1–306.3, 361/311, 303
See application file for complete search history.

(56) References Cited

U.S. PATENT DOCUMENTS

| | | | |
|---|---|---|---|
| 4,604,676 A | | 8/1986 | Senda et al. |
| 5,107,394 A | * | 4/1992 | Naito et al. .................. 361/309 |
| 5,426,560 A | * | 6/1995 | Amaya et al. ................ 361/309 |
| 5,712,758 A | * | 1/1998 | Amano et al. ............. 361/321.2 |
| 5,805,409 A | * | 9/1998 | Takahara et al. ............. 361/303 |
| 6,259,593 B1 | * | 7/2001 | Moriwaki et al. ............ 361/303 |
| 6,310,757 B1 | * | 10/2001 | Tuzuki et al. ............. 361/308.1 |
| 6,344,963 B1 | * | 2/2002 | Mori ....................... 361/306.3 |
| 6,381,118 B1 | * | 4/2002 | Yokoyama et al. ....... 361/308.1 |
| 6,388,864 B1 | * | 5/2002 | Nakagawa et al. .......... 361/309 |
| 6,771,485 B2 | * | 8/2004 | Yokoyama et al. .......... 361/309 |
| 6,773,827 B2 | * | 8/2004 | Higuchi ...................... 428/646 |

(Continued)

FOREIGN PATENT DOCUMENTS

JP    2-116720 U    9/1990

(Continued)

OTHER PUBLICATIONS

Partial English translation of JP 2-116720, published on Sep. 19, 1990; Kind Code: U.

(Continued)

*Primary Examiner*—Eric Thomas
(74) *Attorney, Agent, or Firm*—Keating & Bennett, LLP

(57) ABSTRACT

In an LW-reverse-type monolithic ceramic capacitor including external terminal electrodes each including a resistance component, internal electrodes include nickel or a nickel alloy, and the external terminal electrodes each include a first layer, a second layer provided on the first layer, and a third layer provided on the second layer. The first layer has a wrap-around portion extending from an end surface to principal surfaces and side surfaces of a capacitor main body, and contains a glass component and a compound oxide that reacts with Ni or the Ni alloy. The second layer covers the first layer such that the edge of the wrap-around portion of the first layer remains exposed, and contains a metal. The third layer covers the edge of the wrap-around portion of the first layer and the second layer, and is formed by plating.

8 Claims, 4 Drawing Sheets

U.S. PATENT DOCUMENTS

| | | |
|---|---|---|
| 7,054,136 B2 | 5/2006 | Ritter et al. |
| 7,304,831 B2 * | 12/2007 | Yoshii et al. ............. 361/321.2 |
| 7,436,649 B2 * | 10/2008 | Omura ................... 361/306.3 |
| 2006/0234022 A1 * | 10/2006 | Liu et al. .................... 428/210 |
| 2007/0128794 A1 | 6/2007 | Kusano et al. |
| 2007/0242416 A1 * | 10/2007 | Saito et al. .............. 361/321.1 |

FOREIGN PATENT DOCUMENTS

| | | |
|---|---|---|
| JP | 06096986 A * | 4/1994 |
| JP | 08-097072 A | 4/1996 |
| JP | 09-148174 A | 6/1997 |
| JP | 2000-357627 A | 12/2000 |
| JP | 2002-217054 A | 8/2002 |
| WO | 2006/022258 A1 | 3/2006 |

OTHER PUBLICATIONS

Official Communication issued in corresponding Japanese Patent Application No. 2008-085617, mailed on Oct. 6, 2009.

* cited by examiner

MONOLITHIC CERAMIC CAPACITOR

BACKGROUND OF THE INVENTION

1. Field of the Invention

The present invention relates to a monolithic ceramic capacitor, and in particular, to an LW-reverse-type monolithic ceramic capacitor including external terminal electrodes each including a resistance component.

2. Description of the Related Art

In a power supply circuit, when a voltage variation in a power supply line is increased by an impedance that is present in the power supply line or a ground, the operation of circuits to be driven becomes unstable, interference between the circuits occurs due to the power supply circuit, or oscillation occurs. Consequently, a decoupling capacitor is usually connected between the power supply line and the ground. The decoupling capacitor decreases the impedance between the power supply line and the ground, thereby suppressing the variation in the power supply voltage and interference between the circuits.

Recently, in communication equipment such as a cell phone and information processing equipment such as a personal computer, as the speed of signals has been increased in order to allow a large amount of information to be processed, the clock frequency of an IC used has also increased. Accordingly, noise that primarily includes harmonic wave components is often generated. Therefore, it has become necessary to provide stronger decoupling in an IC power supply circuit.

In order to increase the decoupling effect, it is effective to use a decoupling capacitor having an excellent impedance-frequency characteristic. An example of such a decoupling capacitor is a monolithic ceramic capacitor. Because of its low equivalent series inductance (ESL), the monolithic ceramic capacitor has an excellent noise-absorbing effect over a wide frequency range as compared to an electrolytic capacitor.

Another function of a decoupling capacitor is to supply electric charges to an IC. A decoupling capacitor is usually disposed in the vicinity of an IC. When a voltage variation occurs in a power supply line, electric charges are rapidly supplied from the decoupling capacitor to the IC, thus preventing a delay of the IC.

When a charge and a discharge occur in a capacitor, a counter-electromotive force represented by a formula $dV = L \cdot di/dt$ is generated in the capacitor. With a large dV, the supply speed of electric charges to the IC is decreased. With an increase in the clock frequency of an IC, the amount of current variation per unit time $di/dt$ tends to increase. Accordingly, in order to decrease the value of dV, it is necessary to decrease the inductance L. For this purpose, it is desirable to further decrease the ESL of a capacitor.

A known example of a low-ESL monolithic ceramic capacitor in which the ESL is further decreased is an LW-reverse-type monolithic ceramic capacitor. In typical monolithic ceramic capacitors, the dimension (dimension W) of each end surface of a capacitor main body in the extending direction of the ceramic layers, the end surface having an external terminal electrode thereon, is less than the dimension (dimension L) of each side surface of the capacitor main body in the extending direction of the ceramic layers, the side surface being adjacent to the end surfaces. In contrast, in LW-reverse-type monolithic ceramic capacitors, the dimension (dimension W) of each end surface in the extending direction of the ceramic layers, the end surface having an external terminal electrode thereon, is greater than the dimension (dimension L) of each side surface in the extending direction of the ceramic layers. In such LW-reverse-type monolithic ceramic capacitors, a current path of a capacitor main body is wide and short, thereby decreasing the ESL.

Another known example of a low-ESL monolithic ceramic capacitor is a multiterminal monolithic ceramic capacitor. In multiterminal monolithic ceramic capacitors, the current path inside a capacitor main body is separated into a plurality of paths, thereby decreasing the ESL.

In low-ESL monolithic ceramic capacitors, the current path is wide and short or is separated as described above. As a result, the equivalent series resistance (ESR) is also decreased.

On the other hand, an increase in the capacitance of monolithic ceramic capacitors has been required. In order to increase the capacitance of a monolithic ceramic capacitor, the number of ceramic layers and the number of laminated internal electrodes may be increased. In this case, the number of current paths is increased, thereby decreasing the ESR.

Accordingly, in response to the requirements to decrease the ESL and increase the capacitance, the ESR of monolithic ceramic capacitors tends to be further decreased.

However, it is known that when the ESR of a capacitor is excessively decreased, a mismatch of impedance occurs in a circuit and a damped oscillation called "ringing" in which the rising of a signal waveform deforms easily occurs. The ringing may cause a malfunction of an IC because of disordered signals.

In addition, when the ESR of a capacitor is excessively decreased, the impedance-frequency characteristic of the capacitor becomes excessively steep near the resonance frequency. More specifically, the valley of the impedance curve becomes excessively deep. Consequently, it may be difficult to absorb noise over a wide frequency range.

In order to prevent ringing or to broaden the impedance-frequency characteristic, a resistance element may be connected in series to a line. In addition, recently, it has been required that a capacitor itself includes a resistance component, and thus, a method of controlling the ESR of such a capacitor using this technique has attracted attention.

For example, Japanese Unexamined Patent Application Publication No. 2004-47983 (document '983) and PCT Publication No. WO 2006/022258 pamphlet (document '258) have disclosed that a resistance component is included in external terminal electrodes that are electrically connected to internal electrodes, thereby controlling the ESR. More specifically, document '983 discloses a thick-film resistance including $RuO_2$. Document '258 discloses that paste including a material having a relatively high specific resistance, such as ITO, is baked on a capacitor main body. However, the techniques described in documents '983 and '258 have problems to be solved as described below.

According to the technique disclosed in document '983, a plating film is formed directly on an underlayer including the resistance component. However, unlike metal particles, necking does not occur in metal oxide particles, such as $RuO_2$ particles, included in the underlayer by baking. Therefore, the density of the resulting film is not significantly high. Consequently, a plating solution or moisture easily intrudes into the film, thus causing a problem of reduced reliability.

In the technique disclosed in document '258, a first layer including a resistance component is completely covered with a second layer composed of a thick film including a metal such as Cu, and a plating film is formed on the second layer. In this configuration, since the first layer is covered with the dense second layer, the reliability of the capacitor is improved as compared to the capacitor disclosed in document '983. However, since the entire thickness of each of the external terminal electrodes is increased by forming the first layer and the second layer, the dimensions of the monolithic ceramic capacitor in the in-plane directions and the height direction increase. Accordingly, it is difficult to reduce the size of the monolithic ceramic capacitor. This problem tends to be particularly troublesome in LW-reverse-type monolithic ceramic capacitors, which have a large area of external terminal electrodes.

An external terminal electrode is formed on each end surface of a capacitor main body. In order to achieve satisfactory mountability, the external terminal electrode typically has a wrap-around portion which is formed so as to extend from an end surface to principal surfaces and side surfaces. As described in document '258, when the first layer is completely covered with the second layer, the second layer is affected by a variation in the thickness of the first layer. Therefore, it is difficult to stabilize the dimensions of the wrap-around portion. If the dimensions of the wrap-around portion vary, the mountability may be adversely affected.

SUMMARY OF THE INVENTION

To overcome the problems described above, preferred embodiments of the present invention provide an LW-reverse-type monolithic ceramic capacitor including external terminal electrodes each including a resistance component, the structure being suitable for improving the mountability of the LW-reverse-type monolithic ceramic capacitor without decreasing the reliability thereof.

A monolithic ceramic capacitor according to a preferred embodiment of the present invention includes a substantially rectangular parallelepiped capacitor main body including a plurality of laminated ceramic layers and having a pair of principal surfaces facing each other, a pair of side surfaces facing each other, and a pair of end surfaces facing each other; at least one pair of internal electrodes provided inside the capacitor main body and each extending to one of the end surfaces; and a pair of external terminal electrodes provided on the end surfaces of the capacitor main body and each electrically connected to any of the internal electrodes, wherein the dimension of each end surface in the extending direction of the ceramic layers is greater than the dimension of each side surface in the extending direction of the ceramic layers.

In order to solve the problems described above, the monolithic ceramic capacitor has the following unique structure.

Specifically, the internal electrodes include nickel (Ni) or a nickel (Ni) alloy. Each of the external terminal electrodes includes a first layer, a second layer provided on the first layer, and a third layer provided on the second layer. The first layer has a wrap-around portion extending from one of the end surfaces to the principal surfaces and the side surfaces, and includes a glass component and a compound oxide that reacts with the Ni or the Ni alloy. The second layer covers the first layer such that the edge of the wrap-around portion of the first layer remains exposed, and includes a metal. The third layer covers the edge of the wrap-around portion of the first layer and the second layer, and is formed by plating.

According to a preferred embodiment of the present invention, since the second layer is arranged such that the edge of the wrap-around portion of the first layer remains exposed, the dimensions of the wrap-around portion of the external terminal electrode are defined by the first layer. As a result, the dimensions of the wrap-around portion of the external terminal electrode are consistent. Thus, satisfactory mountability of the monolithic ceramic capacitor can be reliably achieved.

Furthermore, since the second layer is arranged such that the edge of the wrap-around portion of the first layer remains exposed, a plating solution or moisture may easily intrude from the edge of the wrap-around portion of the first layer. However, the distance between the edge of the wrap-around portion and a capacitance-forming portion of the internal electrodes is sufficiently large, and thus, the plating solution or moisture does not easily reach the capacitance-forming portion. Therefore, the reliability of the monolithic ceramic capacitor is not significantly decreased.

In addition, since the second layer does not completely cover the first layer and is formed such that the edge of the wrap-around portion remains exposed, this structure enables a decrease in the thickness of the external terminal electrode at the wrap-around portion. Consequently, the size of the monolithic ceramic capacitor can be reduced accordingly.

In order to reduce the size of the monolithic ceramic capacitor, a first layer having a small thickness may be formed. However, it is difficult to use this structure from the standpoint of the ESR. When the capacitor main body is cut in a direction substantially parallel to a side surface thereof and the cross section is viewed, the thickness at both ends of the first layer is less than the thickness at the center of the first layer. Therefore, the current path at both ends of the first layer is reduced. In addition to this structure, when the thickness of the first layer is reduced, the current path at both ends of the first layer is further reduced. Consequently, even though a material having a high specific resistance is used as the first layer, current concentrates at an area in which the current path is short. In such a case, a desired ESR may not be achieved.

Furthermore, according to a preferred embodiment of the present invention, the internal electrodes include nickel (Ni) or a nickel (Ni) alloy, and the first layer of each of the external terminal electrodes includes a compound oxide that reacts with Ni or the Ni alloy. Accordingly, a satisfactory connection state can be provided between the internal electrodes and the external terminal electrodes.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
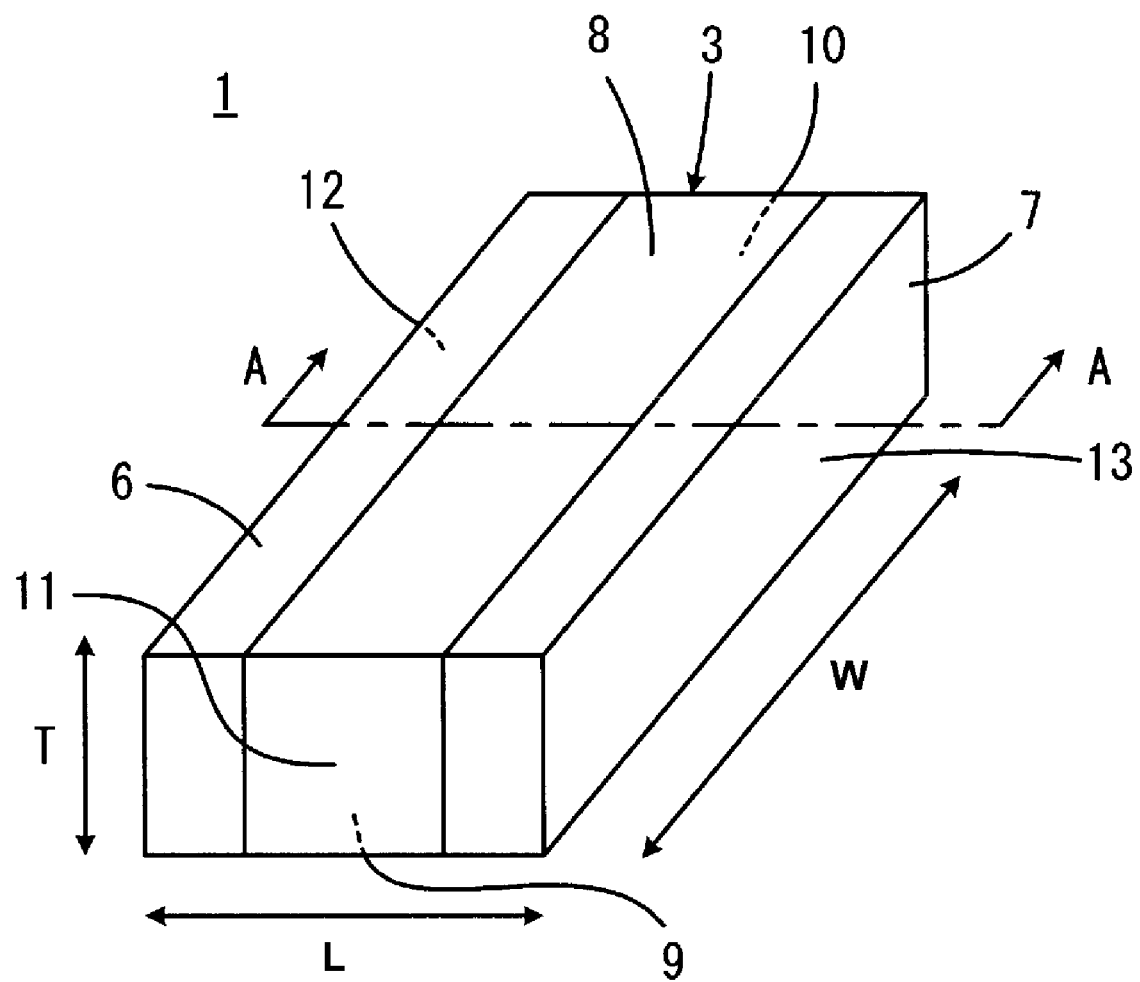
FIG. 1 is a perspective view showing a monolithic ceramic capacitor according to a preferred embodiment of the present invention.
Figure 2:
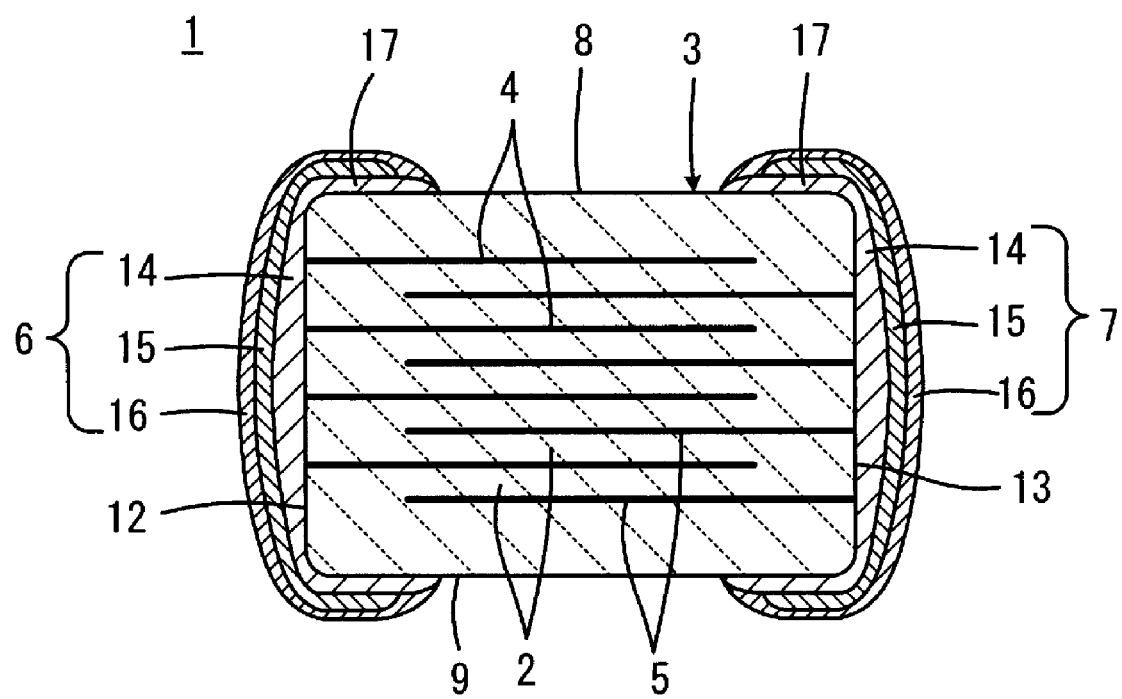
FIG. 2 is a cross-sectional view of the monolithic ceramic capacitor taken along line A-A in FIG. 1.

FIG. 1 is a perspective view showing a monolithic ceramic capacitor 1 according to a preferred embodiment of the present invention. FIG. 2 is a cross-sectional view of the monolithic ceramic capacitor 1 taken along line A-A in FIG. 1.

The monolithic ceramic capacitor 1 includes a capacitor main body 3 including a plurality of laminated ceramic layers 2, at least one pair of internal electrodes 4 and 5 provided inside the capacitor main body 3, a first external terminal electrode 6, and a second external terminal electrode 7. The first external terminal electrode 6 and the second external terminal electrode 7 are provided on outer surfaces of the capacitor main body 3 so as to face each other.

Each of the ceramic layers 2 in the capacitor main body 3 is preferably made of, for example, a dielectric ceramic including, as a main component, $BaTiO_3$, $CaTiO_3$, $SrTiO_3$, $CaZrO_3$, or other suitable material. An auxiliary component such as a manganese (Mn) compound, an iron (Fe) compound, a chromium (Cr) compound, a cobalt (Co) compound, or a nickel (Ni) compound may be added to the main component. The thickness of each of the ceramic layers 2 is preferably, for example, in the range of about 1 μm to about 10 μm, for example.

The capacitor main body 3 preferably has a substantially rectangular parallelepiped shape having a first principal surface 8 and a second principal surface 9 facing each other, a first side surface 10 and a second side surface 11 facing each other, and a first end surface 12 and a second end surface 13 facing each other.

In the capacitor main body 3, the dimension (dimension W) of each of the first end surface 12 and the second surface 13 in the extending direction of the ceramic layers 2 is greater than the dimension (dimension L) of each of the first side surface 10 and the second side surface 11 in the extending direction of the ceramic layers 2. The dimension W is preferably in the range of about 1.5 to about 2.5 times the dimension L, for example. The first external terminal electrode 6 is provided on the first end surface 12, and the second external terminal electrode 7 is provided on the second end surface 13.

Figure 3A:
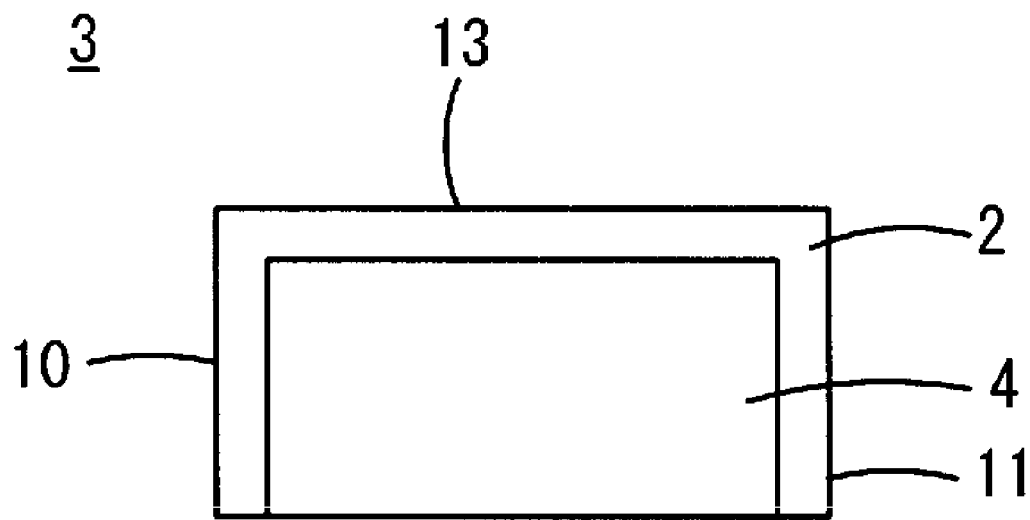
FIG. 3A is a view showing a cross section through which a first internal electrode in a capacitor main body shown in FIG. 1 passes.
Figure 3B:
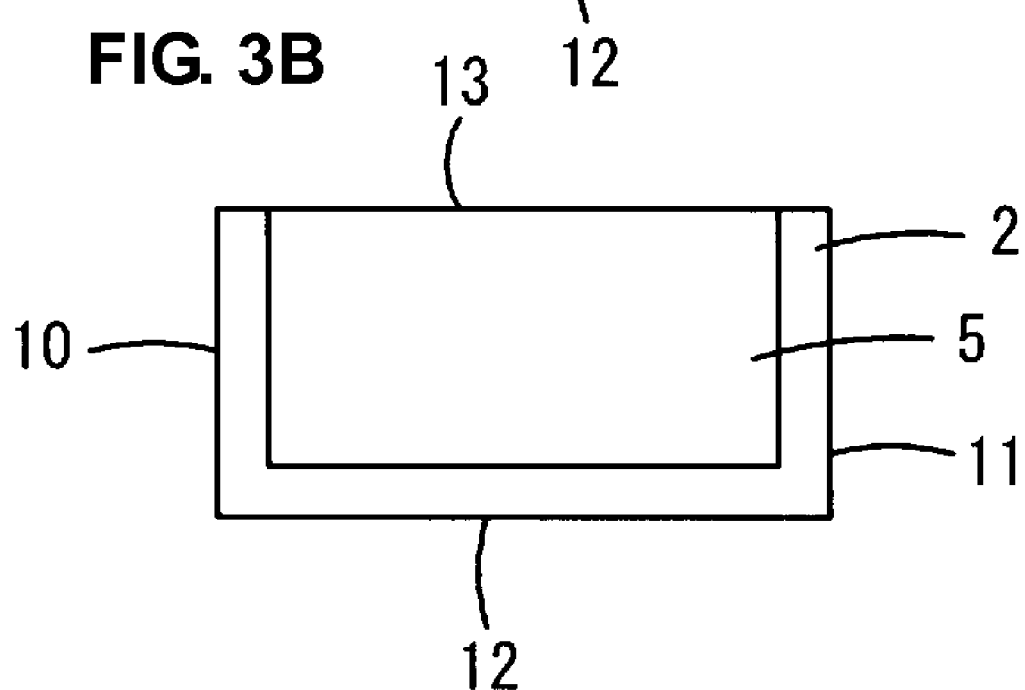
FIG. 3B is a view showing a cross section through which a second internal electrode in the capacitor main body shown in FIG. 1 passes.

FIG. 3A is a view showing a cross section through which the first internal electrode 4 in the capacitor main body 3 passes, and FIG. 3B is a view showing a cross section through which the second internal electrode 5 in the capacitor main body 3 passes.

As shown in FIG. 3A, the first internal electrode 4 extends to the first end surface 12 of the capacitor main body 3. Accordingly, the first internal electrode 4 is electrically connected to the first external terminal electrode 6. On the other hand, as shown in FIG. 3B, the second internal electrode 5 extends to the second end surface 13 of the capacitor main body 3. Accordingly, the second internal electrode 5 is electrically connected to the second external terminal electrode 7. As is apparent from FIG. 2, the first internal electrodes 4 and the second internal electrodes 5 are alternately disposed in the laminating direction, with the ceramic layers 2 therebetween.

Nickel (Ni) or a nickel (Ni) alloy is preferably used as a conductive component included in the internal electrodes 4 and 5. The thickness of each of the internal electrodes 4 and 5 is preferably in the range of about 1 μm to about 10 μm, for example.

The first external terminal electrode 6 includes a first layer 14 provided on the first end surface 12 of the capacitor main body 3, a second layer 15 provided on the first layer 14, and a third layer 16 provided on the second layer 15. Similarly, the second external terminal electrode 7 includes a first layer 14 provided on the second end surface 13 of the capacitor main body 3, a second layer 15 provided on the first layer 14, and a third layer 16 provided on the second layer 15.

The first layer 14 includes a resistance component and is formed by applying resistance paste including the resistance component followed by baking. By forming the first layer 14, the resistance component is provided in series with the capacitance provided by the monolithic ceramic capacitor 1. Thus, the ESR of the monolithic ceramic capacitor 1 can be increased.

Note that the term "resistance component" means a component having a relatively high specific resistance excluding metals and glass included in typical external terminal electrodes. More specifically, the resistance component is preferably a metal oxide excluding glass, for example. Examples of the metal oxide used in this preferred embodiment include compound oxides such as an In—Sn compound oxide (ITO), a La—Cu compound oxide, a Sr—Fe compound oxide, and a Ca—Sr—Ru compound oxide. These compound oxides such as an In—Sn compound oxide (ITO), a La—Cu compound oxide, a Sr—Fe compound oxide, and a Ca—Sr—Ru compound oxide have satisfactory reactivity with Ni. Therefore, as described above, a satisfactory connection between the internal electrodes 4 and 5 including Ni and a Ni alloy and the external terminal electrodes 6 and 7 can be achieved.

Glass is preferably added to the first layer 14. For example, B—Si glass, B—Si—Zn glass, B—Si—Zn—Ba glass, or B—Si—Zn—Ba—Ca—Al glass can be used as the glass. When glass is added to the first layer 14, the volume ratio of the resistance component to the glass is preferably in the range of about 30:70 to about 70:30, for example.

The first layer 14 may include a metal such as Ni, Cu, Mo, Cr, or Nb and a metal oxide such as $Al_2O_3$, $TiO_2$, $ZrO_2$, or $ZnO_2$. These substances adjust the specific resistance provided by the first layer 14 and the density of the first layer 14. More specifically, the addition of the above metal decreases the specific resistance, whereas the addition of the above metal oxide increases the specific resistance. The addition of Ni, Cu, $Al_2O_3$, or $TiO_2$ accelerates densification of the first layer 14. On the other hand, the addition of Mo, Cr, Nb, $ZrO_2$, or $ZnO_2$ suppresses densification of the first layer 14. Note that suppression of densification means to prevent the generation of a blister due to excessive firing of the first layer 14.

The first layer 14 includes a wrap-around portion 17 extending from the end surface 12 or 13 to the principal surfaces 8 and 9 and the side surfaces 10 and 11. The edge of the wrap-around portion 17 is covered with the third layer 16 as described below. When the third layer 16 is formed by electrolytic plating, the first layer 14 preferably has a conductivity to the extent that a plated film can be precipitated. Accordingly, when electrolytic plating is performed, a metal such as Ni is preferably added to the first layer 14 as described above. More specifically, the specific resistance of the first layer 14 is preferably in the range of about 0.1 Ω·cm to about 1.0 Ω·cm, for example.

In this preferred embodiment, the dimensions of the wrap-around portion of the external terminal electrodes 6 and 7 are defined by the wrap-around portion 17 of the first layer 14. Accordingly, the dimensions of the wrap-around portion of the external terminal electrodes 6 and 7 are substantially consistent.

The second layer 15 covers the first layer 14 such that the edge of the wrap-around portion 17 of the first layer 14 remains exposed. The second layer 15 improves moisture resistance and a plating film-forming property.

The second layer 15 primarily includes a metal and is formed by applying conductive paste including a metal powder and baking the conductive paste. Examples of the metal included in the second layer 15 include Cu, Ni, Ag, Pd, a Ag—Pd alloy, and Au, for example. In addition, glass is preferably added to the second layer 15. As this glass, the same glass as that included in the first layer 14 or glass including the same main component as that included in the glass in the first layer 14 is preferably used.

Since the second layer 15 is arranged such that the edge of the wrap-around portion 17 of the first layer 14 remains exposed, the size of the monolithic ceramic capacitor 1 can be reduced. In this structure, although a portion of the first layer 14 is exposed, the position of the edge of the wrap-around portion 17 is spaced from the positions of the internal electrodes 4 and 5, which define a capacitance-forming portion. Accordingly, even if a plating solution or moisture intrudes from the edge of the wrap-around portion 17, the plating solution or moisture does not reach the capacitance-forming portion. Therefore, this structure prevents a decrease in the reliability.

The third layer 16 is arranged so as to cover the edge of the wrap-around portion 17 of the first layer 14 and the second layer 15. The third layer 16 is preferably formed by plating. When the monolithic ceramic capacitor 1 is mounted using solder, the third layer 16 preferably has a two-layer structure including a Ni plating film and a Sn plating film disposed on the Ni plating film, for example. When the monolithic ceramic capacitor 1 is mounted with a conductive adhesive or by wire bonding, the third layer 16 preferably has a two-layer structure including a Ni plating film and an Au plating film disposed on the Ni plating film, for example. When the monolithic ceramic capacitor 1 is embedded in a resin substrate, at least the outermost layer of the third layer 16 is preferably formed by copper (Cu) plating, for example.

The structure of the third layer 16 is not limited to the two-layer structure described above. The third layer 16 may include a single layer or three or more layers. Preferably, the thickness of each layer of the plating films defining the third layer 16 is in the range of about 1 μm to about 10 μm, for example. Furthermore, a resin layer for relieving stress may be provided between the second layer 15 and the third layer 16.

Figure 4:
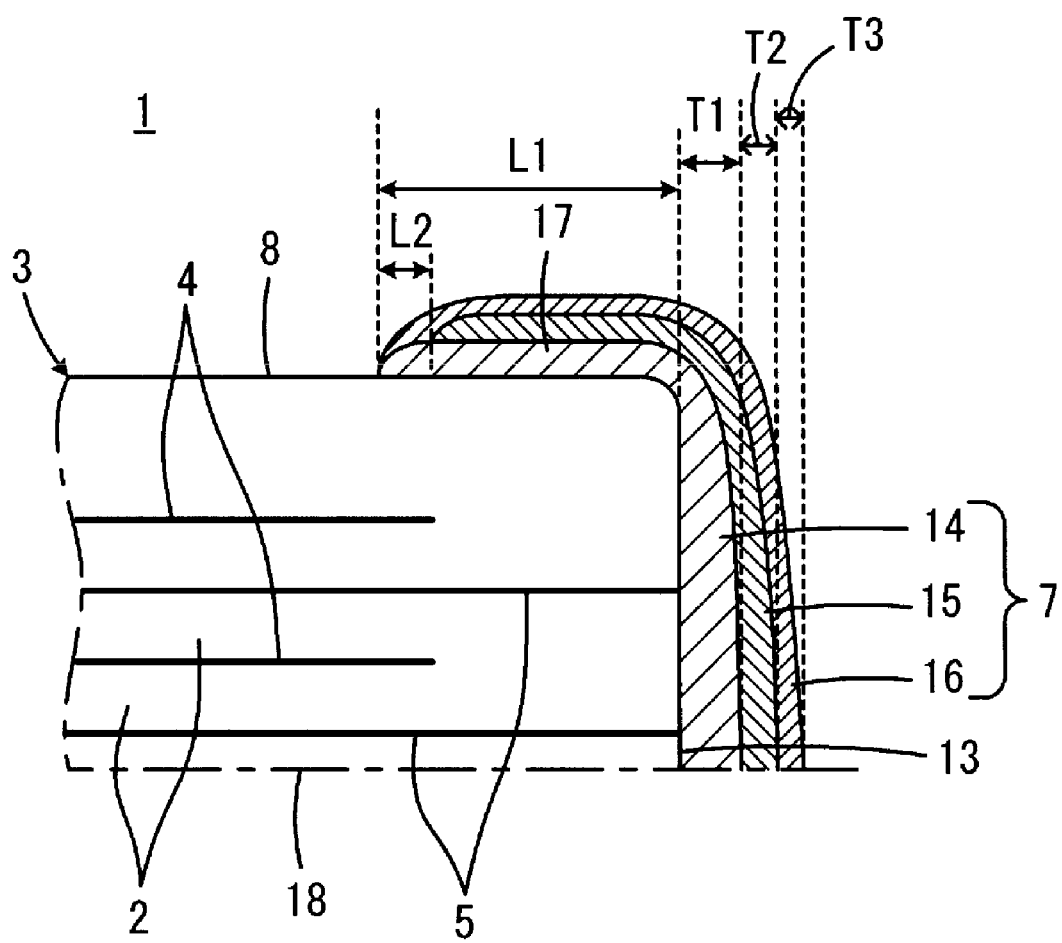
FIG. 4 is a partially enlarged cross-sectional view of a second external terminal electrode included in the monolithic ceramic capacitor shown in FIG. 1.

FIG. 4 is a partially enlarged cross-sectional view of the second external terminal electrode 7. Although the first external terminal electrode 6 is not shown in FIG. 4, the first external terminal electrode 6 has substantially the same structure as the second external terminal electrode 7.

In FIG. 4, examples of dimensions of the second external terminal electrode 7 are shown. Specifically, the length of the wrap-around portion 17 of the first layer 14 is denoted by L1, and the length of the exposed edge of the first layer 14 is denoted by L2. The thickness of the thickest portion of the first layer 14 on the second end surface 13 is denoted by T1, the thickness of the thickest portion of the second layer 15 is denoted by T2, and the thickness of the thickest portion of the third layer 16 is denoted by T3. Note that, for convenience, the thickest portions of the first layer 14, the second layer 15, and the third layer 16 are defined as portions cut along a virtual cutting line 18 passing through the center of the thickness direction of the capacitor main body 3.

Regarding the above-mentioned length L1 of the wrap-around portion 17 of the first layer 14 and the length L2 of the exposed edge, preferably, the relationship $0.2 \leq L2/L1 \leq 0.5$ is preferably satisfied.

If the ratio L2/L1 is less than about 0.2, for example, the thickness of the second layer 15 may be excessively large. On the other hand, if the ratio L2/L1 is more than about 0.5, for example, a plating solution or moisture easily intrudes from the wrap-around portion 17 of the first layer 14, and thus the reliability is decreased. For example, when the capacitor main body 3 has approximate dimensions of about 1.6 mm×about 0.8 mm×about 0.8 mm, L1 is preferably in the range of about 200 μm to about 250 μm, for example. In this case, L2 is preferably in the range of about 50 μm to about 100 μm, for example.

Furthermore, the thickness T1 of the first layer 14 is preferably in the range of about 20 μm to about 30 μm, for example, the thickness T2 of the second layer 15 is preferably in the range of about 20 μm to about 30 μm, for example, and the thickness T3 of the third layer 16 is preferably in the range of about 5 μm to about 15 μm, for example. If the thickness T1 of the first layer 14 is outside of the above range of about 20 μm to about 30 μm and less than about 20 μm, the variation in the film thickness of the first layer 14 is increased, and thus, the variation in the ESR is increased. On the other hand, if the thickness T1 of the first layer 14 is greater than about 30 μm, in a production process described below, it is necessary to dip the capacitor main body 3 into resistance paste more deeply. In such a case, the resistance paste is applied on the capacitor main body 3 in a state in which the capacitor main body 3 is slanted. As a result, the length L1 of the wrap-around portion 17 of the first layer 14 may vary.

An example of a method of producing the above monolithic ceramic capacitor 1 will now be described.

First, ceramic green sheets used for the ceramic layers 2, conductive paste for the internal electrodes 4 and 5, and resistance paste and conductive paste for the external terminal electrodes 6 and 7 are prepared. The ceramic green sheets, the conductive paste for the internal electrodes 4 and 5, and the conductive paste for the external terminal electrodes 6 and 7 include binders and solvents. Known organic binders and organic solvents can be used as the binders and the solvents, for example.

Next, the conductive paste for the internal electrodes 4 and 5 is printed on each of the ceramic green sheets so as to have a predetermined pattern by, for example, a screen printing method. Accordingly, ceramic green sheets having a conductive paste film for each of the inner electrodes 4 and 5 thereon are obtained.

Next, a predetermined number of ceramic green sheets on which the conductive paste film is formed as described above are laminated in a predetermined order. A predetermined number of ceramic green sheets for outer layers, the green sheets not having conductive paste film thereon, are further laminated on the top and the bottom of the laminated ceramic green sheets. Thus, an unfired mother laminate is prepared. The unfired mother laminate is optionally pressure-bonded in the laminating direction by, for example, isostatic pressing.

Next, the unfired mother laminate is cut so as to have a predetermined size, thus allowing an unfired capacitor main body 3 to be prepared.

The unfired capacitor main body 3 is then fired. The firing temperature depends on the ceramic material contained in the ceramic green sheets and the metal material contained in the conductive paste films, but is preferably selected from the range of about 900° C. to about 1,300° C., for example.

Next, the resistance paste is applied on the first end surface 12 and the second end surface 13 of the fired capacitor main body 3 and then baked to form the first layer 14 for the first external terminal electrode 6 and the second external terminal electrode 7. This baking temperature is preferably in the range of about 700° C. to about 900° C., for example. Regarding the atmosphere during baking, an atmosphere such as air or $N_2$ is appropriately selected in accordance with the component of the resistance paste.

Subsequently, the conductive paste for the external terminal electrodes 6 and 7 is applied on the first layer 14 and then baked to form the second layer 15. This baking temperature is preferably in the range of about 700° C. to about 900° C., for example. Furthermore, this baking temperature of the conductive paste is preferably less than the baking temperature for forming the first layer 14. Regarding the atmosphere during baking, an atmosphere such as air or $N_2$ is appropriately selected in accordance with the type of metal included in the conductive paste.

Next, the third layer 16 is formed on the second layer 15 by plating. Thus, the monolithic ceramic capacitor 1 is produced.

While preferred embodiments of the invention have been described above, it is to be understood that variations and modifications will be apparent to those skilled in the art without departing the scope and spirit of the invention. The scope of the invention, therefore, is to be determined solely by the following claim.

What is claimed is:

1. A monolithic ceramic capacitor comprising:
    a capacitor main body including a plurality of laminated ceramic layers and having a pair of principal surfaces facing each other, a pair of side surfaces facing each other, and a pair of end surfaces facing each other;
    at least one pair of internal electrodes provided inside the capacitor main body and each extending to one of the end surfaces; and
    a pair of external terminal electrodes provided on the end surfaces of the capacitor main body and each electrically connected to any of the internal electrodes; wherein
    a dimension of each end surface in the extending direction of the ceramic layers is greater than a dimension of each side surface in the extending direction of the ceramic layers;
    the internal electrodes include at least one of nickel and a nickel alloy;
    each of the external terminal electrodes includes a first layer, a second layer provided on the first layer, and a third layer provided on the second layer;
    the first layer includes a wrap-around portion extending from one of the end surfaces to the principal surfaces and the side surfaces, and includes a glass component and a compound oxide that reacts with the at least one of the nickel and the nickel alloy;
    the second layer covers the first layer such that the edge of the wrap-around portion of the first layer remains exposed, and includes a metal; and
    the third layer covers the edge of the wrap-around portion of the first layer and the second layer, and is made of plated material.

2. The monolithic ceramic capacitor according to claim 1, wherein each of the plurality of ceramic layers is made of a dielectric ceramic including at least one of $BaTiO_3$, $CaTiO_3$, $SrTiO_3$, or $CaZrO_3$.

3. The monolithic ceramic capacitor according to claim 1, wherein the dimension of each end surface in the extending direction of the ceramic layers is in the range of about 1.5 to about 2.5 times the dimension of each side surface in the extending direction of the ceramic layers.

4. The monolithic ceramic capacitor according to claim 1, wherein the glass component of the first layer includes at least one of B—Si glass, B—Si—Zn glass, B—Si—Zn—Ba glass, or B—Si—Zn—Ba—Ca—Al glass.

5. The monolithic ceramic capacitor according to claim 1, wherein a thickness of each of the internal electrodes is in the range of about 1 μm to about 10 μm.

6. The monolithic ceramic capacitor according to claim 1, wherein a specific resistance of the first layer is in the range of about 0.1 Ω·cm to 1.0 Ω·cm.

7. The monolithic ceramic capacitor according to claim 1, wherein the second layer includes at least one of Cu, Ni, Ag, Pd, a Ag—Pd alloy, and Au.

8. The monolithic ceramic capacitor according to claim 1, wherein the capacitor main body has a substantially rectangular parallelepiped shape.

* * * * *